(12) United States Patent
Lin et al.

(10) Patent No.: US 9,297,894 B2
(45) Date of Patent: Mar. 29, 2016

(54) ELECTRONIC DEVICE FOR PREVENTING AN ACCIDENTAL TOUCH AND OPERATING METHOD THEREOF

(71) Applicant: WISTRON CORP., New Taipei (TW)

(72) Inventors: Shih-Chao Lin, New Taipei (TW); Yung-Feng Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 409 days.

(21) Appl. No.: 13/945,904

(22) Filed: Jul. 19, 2013

(65) Prior Publication Data
US 2014/0265631 A1 Sep. 18, 2014

(30) Foreign Application Priority Data

Mar. 14, 2013 (TW) .............................. 102109019 A

(51) Int. Cl.
| | |
|---|---|
| H01H 35/00 | (2006.01) |
| H01H 83/00 | (2006.01) |
| G01S 13/90 | (2006.01) |
| G06F 1/32 | (2006.01) |
| G06F 3/038 | (2013.01) |
| G06F 1/16 | (2006.01) |

(52) U.S. Cl.
CPC ................. *G01S 13/90* (2013.01); *G06F 1/169* (2013.01); *G06F 1/1662* (2013.01); *G06F 1/3231* (2013.01); *G06F 3/038* (2013.01); *Y10T 307/766* (2015.04)

(58) Field of Classification Search
CPC ....... G01S 13/90; G06F 1/1662; G06F 1/169; G06F 1/3231; G06F 3/038; Y10T 307/766
USPC .......................................................... 307/116
See application file for complete search history.

(56) References Cited

U.S. PATENT DOCUMENTS

2013/0179123 A1    7/2013   Krapf et al.

FOREIGN PATENT DOCUMENTS

| | | |
|---|---|---|
| CN | 102652270 A | 8/2012 |
| EP | 2509229 A1 | 10/2012 |
| TW | 200823721 A | 6/2008 |

OTHER PUBLICATIONS

The office action of the corresponding Taiwanese application and its partial English translation of the marked up paragraphs.

*Primary Examiner* — Hal Kaplan
(74) *Attorney, Agent, or Firm* — CKC & Partners Co., Ltd.

(57) ABSTRACT

An electronic device for preventing an accidental touch and an operating method thereof are disclosed, where the electronic device includes a first input device, a second input device, synthetic aperture radar and a main system. The synthetic aperture radar can sense whether a charged body is positioned near the second input device. When the charged body is positioned near the second input device, a voltage state of the synthetic aperture radar is pulled to a first logic level. When the voltage state of the synthetic aperture radar is in the first logic level, the main system disables the first input device.

16 Claims, 3 Drawing Sheets

ELECTRONIC DEVICE FOR PREVENTING AN ACCIDENTAL TOUCH AND OPERATING METHOD THEREOF

RELATED APPLICATIONS

This application claims priority to Taiwanese Patent Application No. 102109019, filed Mar. 14, 2013, the entirety of which is herein incorporated by reference.

BACKGROUND

1. Technical Field

The present disclosure relates to panel, and more particularly, an electronic device for preventing an accidental touch and an operating method thereof.

2. Description of Related Art

In recent years, new electronic products (e.g., notebooks, smart phones, tablets, etc.) enter the market constantly with the advancement of science and technology. With respect to the development trends, electronic devices often have more than two input interfaces; for example, most common notebooks are equipped with a keyboard and a touch pad. The touch pad is often disposed under the keyboard, and hence, the user may accidentally touch the touch pad by mistake, resulting inconvenience during use.

Further, if users enter the command (e.g., characters) at a wrong position because of the accidental touch, they have to delete the wrongly entered portion, move the cursor back to the correct position, and then re-enter the command. This is time-wasting and reduces the working efficiency of the user.

In view of the foregoing, there exist problems and disadvantages in the current electronic products that await further improvement. However, those skilled in the art sought vainly for a solution. In order to solve or circumvent above problems and disadvantages, there is an urgent need in the related field to prevent the accidental touch of the touch panel.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides an electronic device for preventing an accidental touch and an operating method thereof so as to solve the problems faced by the prior art.

According to embodiments of the present disclosure, the electronic device for preventing an accidental touch comprises a first input device, a second input device, a synthetic aperture radar and a main system. The synthetic aperture radar is configured to sense whether a charged body is positioned near the second input device, such that when the charged body is positioned near the second input device, a voltage state of the synthetic aperture radar is pulled to a first logic level. When the voltage state of the synthetic aperture radar is in the first logic level, the main system is configured to disable the first input device.

When the charged body is not positioned near the second input device, the voltage state of the synthetic aperture radar is pulled to a second logic level, and the main system enables the first input device.

In one embodiment, the main system comprises an embedded controller. The embedded controller electronically connects the first and the second input devices with the synthetic aperture radar, such that when the main system is in a working state, the embedded controller is configured to poll the synthetic aperture radar, so that when the voltage state of the synthetic aperture radar is in the first logic level, the embedded controller is configured to send a control command for disabling the first input device to the first input device.

In another embodiment, the main system comprises an embedded controller. The embedded controller electronically connects the first and the second input devices with the synthetic aperture radar, such that after the main system is woken from an idle state by the input from the first input device, the embedded controller polls the synthetic aperture radar, so that when the voltage state of the synthetic aperture radar is in the first logic level, the embedded controller is configured to send a control command for disabling the first input device to the first input.

On the other hand, when the main system is woken from an idle state by the input from the second input device, the embedded controller records does not poll the synthetic aperture radar.

In yet another embodiment, the main system comprises an embedded controller, a south bridge circuit and a basic input/output system (BIOS). The embedded controller is electrically connected to the first and the second input devices; the south bridge circuit is electrically connected to the synthetic aperture radar; and the basic input/output system is electrically connected to the south bridge circuit, such that when the main system is in a working state, the basic input/output system is configured to poll the synthetic aperture radar, and when the synthetic aperture radar senses that the charged body is positioned near the second input device and sends such event to the south bridge circuit, the basic input/output system detects that the general purpose input/output (GPIO) port of the south bridge circuit has a logic level of 1 and sends a control to command for disabling the first input device to the first input device.

In yet another embodiment, main system comprises an embedded controller, a south bridge circuit and a basic input/output system. The embedded controller is electrically connected to the first and the second input devices; the south bridge circuit is electrically connected to the synthetic aperture radar; and the basic input/output system is electrically connected to the south bridge circuit, such that after the main system is woken from an idle state by the input from the first input device, the basic input/output system is configured to poll the synthetic aperture radar, and when the synthetic aperture radar senses that the charged body is positioned near the second input device and sends such event to the south bridge circuit, the basic input/output system detects that the general purpose input/output port of the south bridge circuit has an logic level of 1 and sends a control command for disabling the first input device to the first input device.

On the other hand, when the main system is waken from an idle state by the input from the second input device, the basic input/output system does not poll the synthetic aperture radar.

The operating method of the electronic device provided by the present disclosure is useful in preventing an accidental touch. The electronic device has a first input device and a second input device, and the operating method comprises the following steps: using a synthetic aperture radar to sense whether a charged body is positioned near the second input device, such that when the charged body is positioned near the second input device, the voltage state of the synthetic aperture radar is pulled to a first logic level; and when the voltage state of the synthetic aperture radar is in the first logic level, the first input device is disabled.

When the charged body is not positioned near the second input device, the voltage state of the synthetic aperture radar is pulled to a second logic level, and the operating method further comprises: when the voltage state of the synthetic aperture radar is the second logic level, enabling the first input device.

In one embodiment, said steps of disabling the first input device comprises: when the main system of the electronic device is in a working state, using an embedded controller to poll the synthetic aperture radar, such that when the voltage state of the synthetic aperture radar is in the first logic level, a control command is sent to the first input device thereby disabling the first input device.

In another embodiment, said step of disabling the first input device comprises: after the main system of the electronic device is woken from an idle state by the input from the first input device, using an embedded controller to poll the synthetic aperture radar, so that when the voltage state of the synthetic aperture radar is in the first logic level, a control command is sent to the first input device thereby disabling the first input device.

Said operating method further comprises: when the main system is woken from an idle state by the input from the second input device, using the embedded controller to terminate the operation.

In yet another embodiment, said step of disabling the first input device comprises: when the main system of the electronic device is in a working state, using the basic input/output system to poll the synthetic aperture radar; when to the synthetic aperture radar senses that the charged body is positioned near the second input device and sends such event to a south bridge circuit, using the basic input/output system to detect that the general purpose input/output port of the south bridge circuit has an logic level of 1 and a control command is sent to the first input device thereby disabling the first input device.

In still another embodiment, said steps of disabling the first input device comprises: after the main system of the electronic device is woken from an idle state by the input from the first input device, using a basic input/output system to poll the synthetic aperture radar, and when the synthetic aperture radar senses that the charged body is positioned near the second input device and sends such event to a south bridge circuit, using the basic input/output system to detect that the general purpose input/output port of the south bridge circuit has an logic level of 1 and a control command is sent to the first input device thereby disabling the first input device.

Said operating method further comprises: when the main system is woken from an idle state by the input from the second input device, using the embedded controller to terminate the operation.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present invention, include:

1. Dynamically determining that whether the user intends to use the first input device or the second input device, so that user may use the electronic device more smoothly; and 2. Improving the working efficiency of the user and preventing the time cost incurred owing to the accidental touch.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
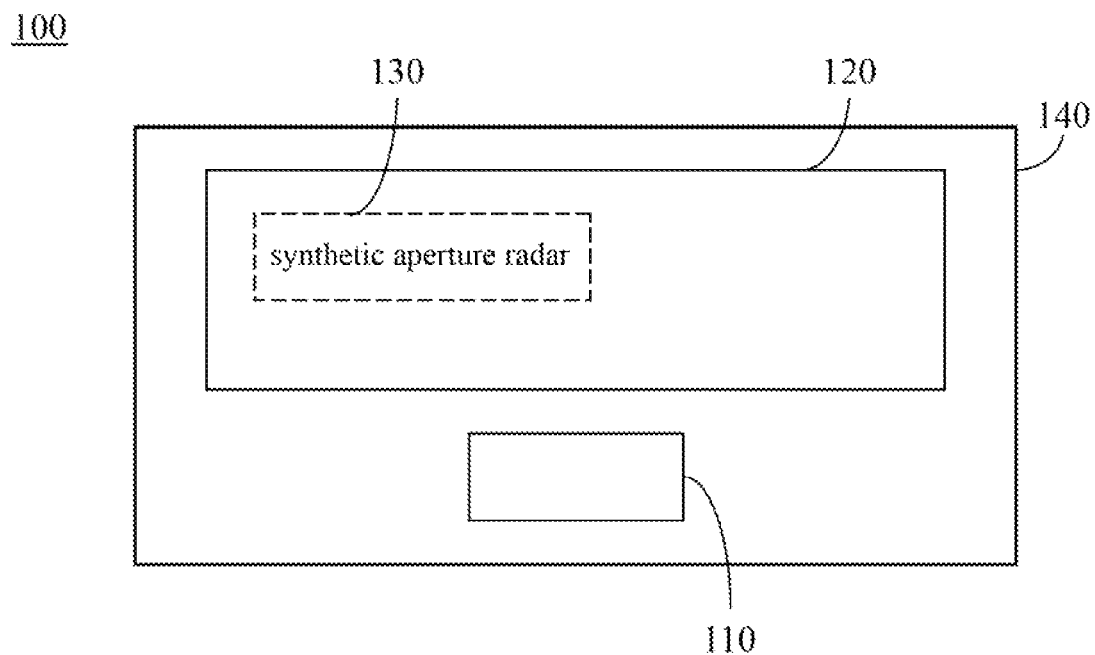
FIG. 1 is a partial layout diagram illustrating an electronic device for preventing an accidental touch according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

FIG. 1 is a partial layout diagram illustrating an electronic device 100 for preventing an accidental touch according to one embodiment of the present disclosure. The electronic device 100 comprises a first input device 110, a second input device 120 and a synthetic aperture radar (SAR) 130. As illustrated in FIG. 1, the electronic device 100 is a notebook, the first input device 110 is a touch pad, the second input device 120 is a keyboard, the touch pad and the keyboard are disposed on the body 140 of the notebook, and the synthetic aperture radar 130 is disposed in the body 140 and adjacent to the keyboard.

When the user intends to use the keyboard, his/her finger approaches the keyboard; and the synthetic aperture radar 130 senses that a charged body (i.e., the finger) is positioned near the keyboard, and the touch pad is disabled to prevent the accidental touch. On the contrary, when the synthetic aperture radar 130 does not sense that a charged body is positioned near the keyboard, to the touch pad is enabled, so that both the keyboard and touch pad function normally. The user behavior is dynamically determined through the above-mentioned mechanism.

It should be noted that, in FIG. 1, said notebook, keyboard and touch pad are merely examples, and the present disclosure is not limited thereto. In practice, the electronic device 100 could be any electronic products, the first input device 110 could be a touch screen, keyboard, button or other input component(s), and the second input device 110 could also be a touch screen, hand-writing panel, button or other input component(s), and those skilled in the art could flexibly select suitable configuration(s) depending on the need.

Figure 2:
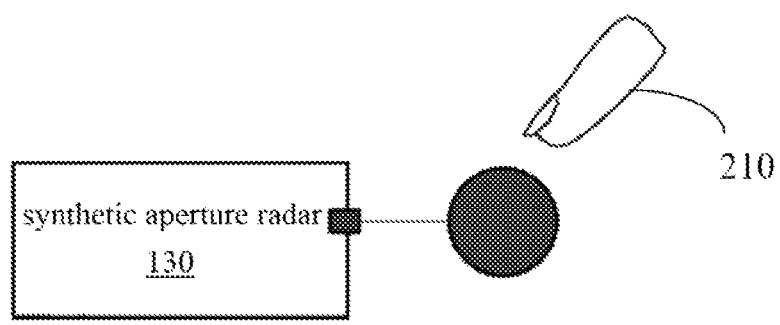
FIG. 2 schematically illustrates an electric field variation according to one embodiment of the present disclosure.

To further illustrate the mechanism of the synthetic aperture radar 130, reference is made to FIG. 2 which schematically illustrates an electric field variation according to one embodiment of the present disclosure. As illustrated In FIG. 2, the charged body 210 is a finger with about 5 pF capacitance for averaged persons, and the synthetic aperture radar 130 has about 20 pF capacitance, and the electric field would be changed when the human body is positioned near the synthetic aperture radar 130. Accordingly, the change in the electric field could be used to triggered the change in the voltage state of the synthetic aperture radar 130 to a high/low logic level, thereby disabling/enabling the keyboard.

Figure 3:
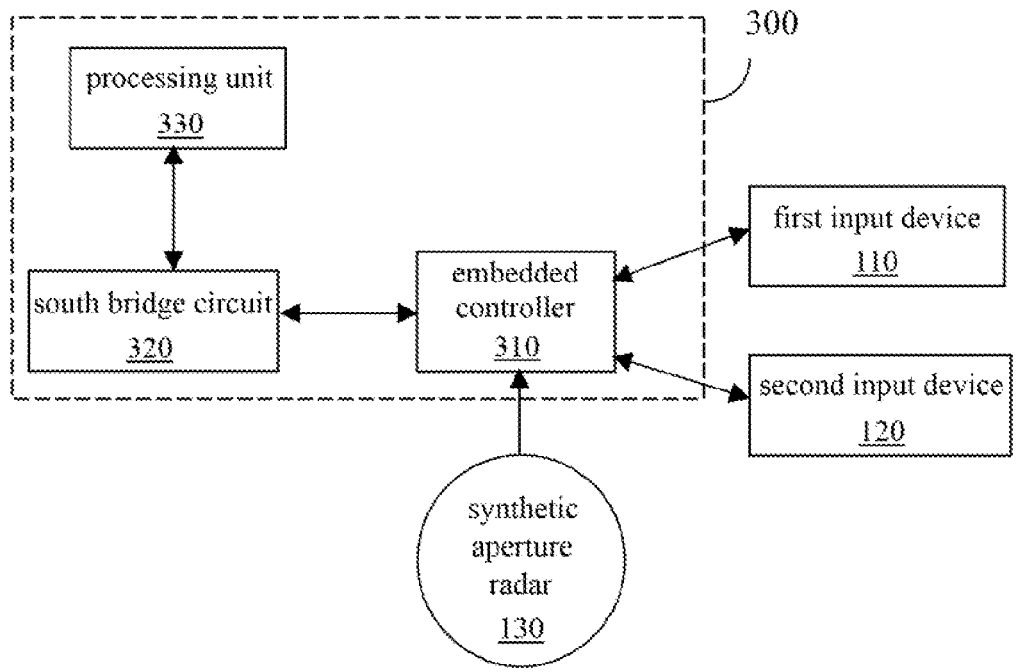
FIG. 3 is a block diagram illustrating an electronic device for preventing an accidental touch according to one embodiment of the present disclosure.

To further describe the component architecture of the electronic device 100, reference is made to FIG. 3 which is a block diagram illustrating an electronic device 100 for preventing an accidental touch according to one embodiment of the present disclosure. As shown in FIG. 3, the electronic device 100 comprises a first input device 110, a second input device 120, a to synthetic aperture radar 130 and a main system 300. Structurally, the main system 300 is electrically connected to the first input device 110, the second input device 120 and the synthetic aperture radar 130.

In operation, the synthetic aperture radar 130 is configured to sense whether a charged body is positioned near the second input device 120, such that when the charged body is positioned near the second input device 120, the voltage state of the synthetic aperture radar 130 is pulled to a first logic level (e.g., a high logic level). When the voltage state of the synthetic aperture radar 130 is in the first logic level, the main system 300 is configured to disable the first input device 110 to prevent an accidental touch.

On the contrary, when the charged body is not positioned near the second input device 120, the voltage state of the synthetic aperture radar 130 is pulled to a second logic level (e.g., a low logic level), and the main system 300 enables the first input device 110; in this instance, both the first input device 110 and the second input device 120 are useable.

In FIG. 3, the main system 300 comprises an embedded controller 310, a south bridge circuit 320 and a processing unit 330. Structurally, the processing unit 330 is electrically connected to the embedded controller 310 through the south bridge circuit 320, and the embedded controller 310 electrically connects the first input device 110, the second input device 120 with the synthetic aperture radar 130.

If the main system 300 is in a working state, meaning that the embedded controller 310, the south bridge circuit 320 and the processing unit 330 are all functional (that is, it is in the "S0" state of general power options), the embedded controller 310 is configured to poll the synthetic aperture radar 130; and when the voltage state of the synthetic aperture radar 130 is in the first logic level, it further sends a control command (e.g., a PS/2 command) to the first input device 110 thereby disabling the first input device 110.

When the main system 300 is in an idle state, all the data under operation can be maintained (that is, it is in the "S3" state (also known as the Suspend to RAM (SIR) state) of general power options); in this instance, the user may wake the main system 300 through either of the first input device 110 or the second input device 120.

After the main system 300 is woken from the idle state by the input from the first input device 110, the embedded controller 310 polls the synthetic aperture radar 130 and may update the logic state; for example, the embedded controller 310 records the logic state as "1". Thereafter, if the charged body is positioned near the second input device 120, and the voltage state of the synthetic aperture radar 130 is in the first logic level, a control command is sent to the first input device 110 thereby disabling the first input device 110 to prevent the accidental touch.

On the other hand, when the main system 300 is woken from the idle state by the input from the second input device 120, the embedded controller 310 does not poll the synthetic aperture radar 130 and may update the logic state; for example, the embedded controller 310 records the logic state as "0".

Figure 4:
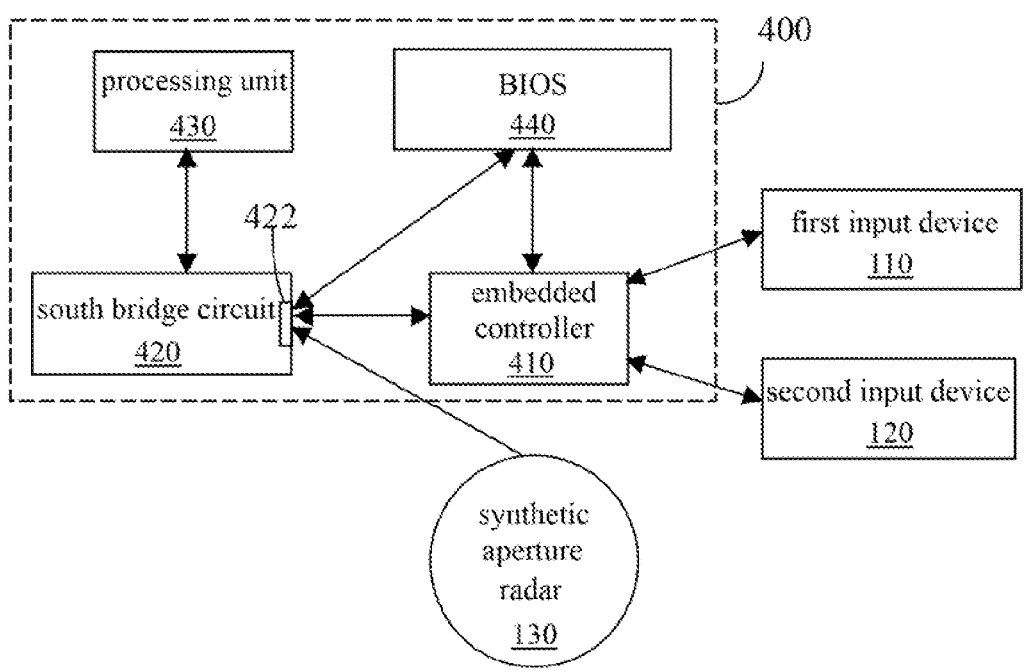
FIG. 4 is a block diagram illustrating an electronic device for preventing an accidental touch according to another embodiment of the present disclosure.

With respect to another component architecture of the electronic device 100, please refer to FIG. 4 which is a block diagram illustrating an electronic device 100 for preventing an accidental touch according to another embodiment of the present disclosure. As illustrated in FIG. 4, the electronic device 100 comprises a first input device 110, a second input device 120, a synthetic aperture radar 130 and a main system 400.

In operation, when the voltage state of the synthetic aperture radar 130 is in the first logic level (indicating that the charged body is positioned near the second input device 120); the main system 300 is configured to disable the first input device to prevent the accidental touch. On the contrary, when the voltage state of the synthetic aperture radar 130 is pulled to a second logic level (indicating that the charged body is not positioned near the second input device 120), the main system 400 enables the first input device 110, and in this instance, both the first input device 110 and the second input device 120 are useable.

In FIG. 4, the main system 400 comprises an embedded controller 410, a south bridge circuit 420, a processing unit 430 and a basic input/output system (BIOS) 440. Structurally, the processing unit 430 is electrically connected to the embedded controller 410 and the synthetic aperture radar 130 through the south bridge circuit 420, the embedded controller 410 is electrically connected to the first input device 110 and second input device 120, the basic input/output system 440 is electrically connected to the south bridge circuit 420 and the embedded controller 410.

If the main system 400 is in a working state (indicating that the embedded controller 410, the south bridge circuit 420, the processing unit 430 and the basic input/output system 440 are all operable), which is the "S0" state of general power options, the basic input/output system 440 is configured to poll the synthetic aperture radar 130; and when the synthetic aperture radar 130 senses that the charged body is positioned near the second input device 120 and sends such event to the south bridge circuit 420, the basic input/output system 440 detects that the general purpose input/output port 422 of the south bridge circuit 420 has an logic level of 1 and consequently sends a control command for disabling the first input device to the first input device 110 to the first input device 110, so as to prevent the accidental touch.

If the main system 400 is in an idle state, all the data under operation can be maintained (that is, it is in the "S3" state of general power options); in this instance, the user may wake the main system 400 through either of the first input device 110 or the second input device 120.

After the main system 400 is woken from the idle state by the input from the first input device 110, the embedded controller 410 may update the logic state; for example, the embedded controller 410 records the logic state as "1" and the basic input/output system 440 is configured to poll the synthetic aperture radar 130; and when the synthetic aperture radar 130 senses that the charged body is positioned near the second input device 120 and sends such event to the south bridge circuit 420, the basic input/output system 440 detects that the general purpose input/output port 422 of the south bridge circuit 420 has an logic level of "1" and consequently sends a control command for disabling the first input device to the first input device 110 to the first input device 110, so as to prevent the accidental touch.

On the contrary, when the synthetic aperture radar 130 does not send to the south bridge circuit 420 an event indicating that the charged body is positioned near the second input device 120, the basic input/output system 440 detects that the general purpose input/output port 422 of the south bridge circuit 420 has a logic level of "0", and hence both the first input device 110 and the second input device 120 are useable.

On the other hand, when the main system 400 is woken from the idle state by the input from the second input device 120, the embedded controller 410 may update the logic state; for example, the embedded controller 410 records the logic state as "0", and the basic input/output system 440 does not poll the synthetic aperture radar 130.

Figure 5:
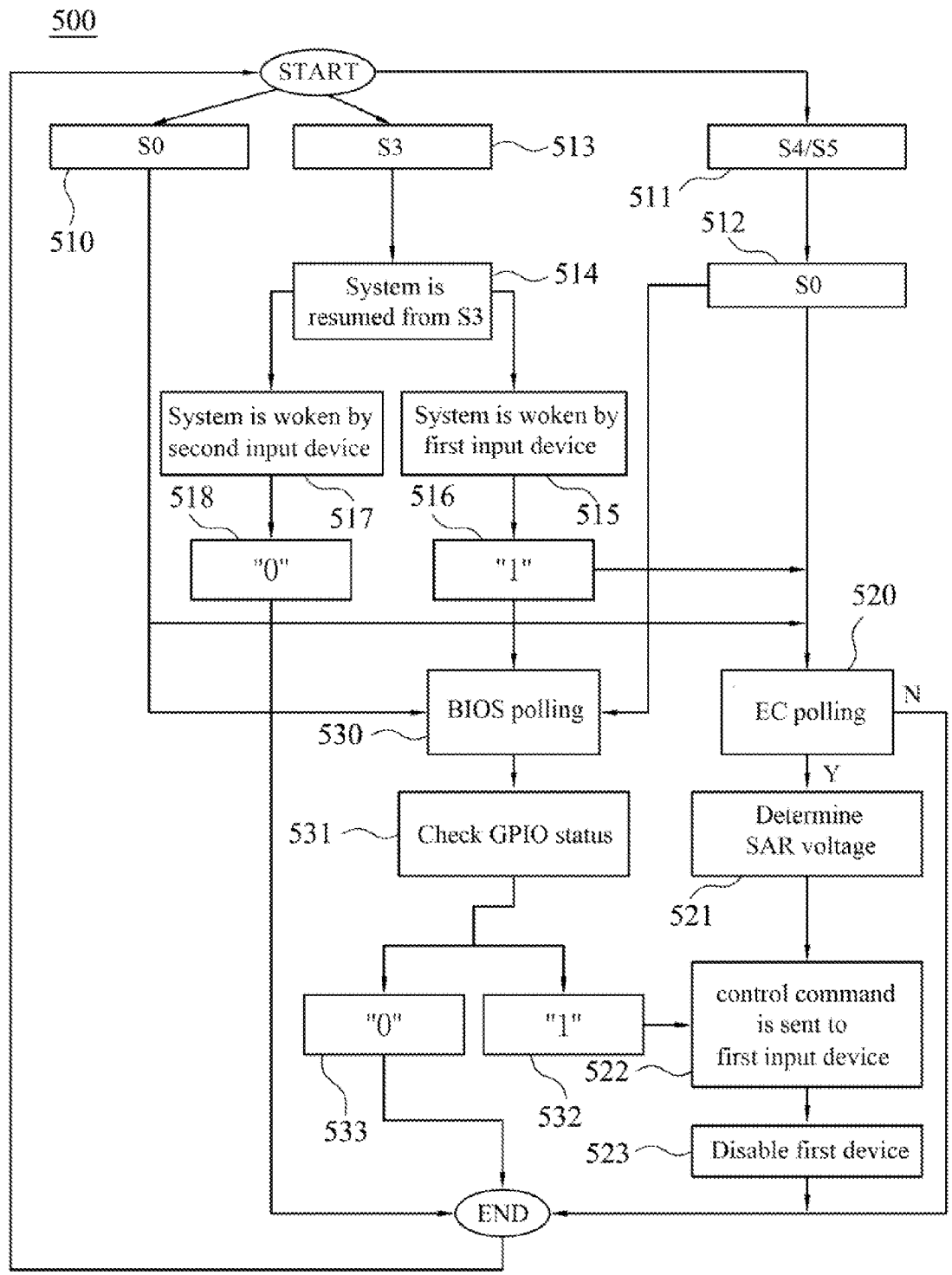
FIG. 5 is a flow diagram illustrating an operating method of an electronic device according to one embodiment of the present disclosure.

FIG. 5 is a flow diagram illustrating an operating method 500 of an electronic device according to one embodiment of the present disclosure. As illustrated in FIG. 5, the operating method 500 comprises steps 510-517. Although FIG. 5 illustrates a particular combination and sequence of steps that may be performed in the present exemplary embodiment, it should be understood that other combinations and sequences of steps are possible. For example, the sequence of these steps could be adjusted depending on actual need, and some of the steps may be performed simultaneously or semi-simultaneously, unless otherwise required by context. The hardware devices required for implementing these steps have been disclosed in the embodiments above, and hence detailed descriptions thereof are omitted herein for the sake of brevity.

In the operating method 500, the synthetic aperture radar is used to sense that whether a charged body is positioned near the second input device, such that when the charged body is positioned near the second input device, the voltage state of the synthetic aperture radar is pulled to a first logic level; thereafter, when the voltage state of the synthetic aperture radar is in the first logic level, the first input device is disabled so as to prevent the accidental touch. On the contrary, when the charged body is not positioned near the second input device, the voltage state of the synthetic aperture radar is pulled to a second logic level: then, when the voltage state of the synthetic aperture radar is the second logic level, the first input device is enabled, and in this instance, the first input device and the second input device are both useable.

The operating method 500 may use an embedded controller to poll the synthetic aperture radar. Specifically, first, in the step 510, the main system of the electronic device enters a working state; then, in step 520, when the main system is in the working state, the embedded controller is used to poll the synthetic aperture radar; next, in step 521, the voltage state of the synthetic aperture radar (SAR) is determined. In step 522, when the voltage state of the synthetic aperture radar is in the first logic level, a control command is sent to the first input device, and then in step 523 the first input device is disabled to prevent the accidental touch.

Alternatively, first, in step 511, the main system is in the "S4 or the "S5" state; in the S4 state (also known as the STD (Suspend to Disk) state), the main power supply of the system is shut down but the hard drive is stilled powered and could be woken; whereas in the "S5" state, all the components including the power supply are shut down and the power consumption is zero; then, in step 512, the main system is resumed to the working state (S0). Thereafter, in step 520, when the main system is in the working state, the embedded controller is used to poll the synthetic aperture radar; and then, in step 521, the voltage state of the synthetic aperture radar is determined. Afterwards, in step 522, when the voltage state of the synthetic aperture radar is in the first logic level, a control command is sent to the first input device; and in step 523, the first input to device is disabled to prevent the accidental touch.

Still alternatively, first, in step 513, the main system is in the "S3" state (that is, the idle state, also known as the STR (Suspend to RAM) state), in which all the data under operation can be stored and the system enters the fake shutdown; then, in step 514, the main system is resumed from the idle state (S3). In step 515, the main system is woken from the idle state by the input from the first input device; next, in step 516, the embedded controller is used to update the logic state; for example, the logic state may be recorded as "1", and in step 520, the synthetic aperture radar is polled; then, in step 521, the voltage state of the synthetic aperture radar is determined. Afterwards, in step 522, when the voltage state of the synthetic aperture radar is in the first logic level, a control command is sent to the first input device, and in step 523, the first input device is disabled to prevent the accidental touch.

On the other hand, in step 517, the main system is woken from the idle state by the input from the second input device; and in step 518, the embedded controller is used to update the logic state; for example, the logic state may be recorded as "0" and the operation is terminated.

In practice, the operating method 500 could also use a basic input/output system to poll the synthetic aperture radar. Specifically, first, in the step 510, the main system of the electronic device enters a working state (i.e., the S0 state). Then, in step 530, when the main system is in the working state, the basic input/output system (BIOS) is used to poll the synthetic aperture radar; next, in step 531, the basic input/output system examines the logic level of the general purpose input/output port (GPIO) through the Windows management instrumentation (WMI). When the synthetic aperture radar sends to a south bridge circuit an event indicating that it is sensed that a charged body is positioned near the second input device, in step 532, the basic input/output system is used to detect that general purpose input/output port of the south bridge circuit has a logic level of 1; and in step 522, a control command is sent to the first input device based on the detection result; then, in step 523, the first input device is disabled. On the contrary, when the synthetic aperture radar does not sent to the south bridge circuit an event indicating that the charged body is positioned near the second input device, then in step 533, the basic input/output system is used to detect that the general purpose input/output port of the south bridge circuit has a logic level of "0," and the operation is terminated.

Alternatively, first, in step 511, the main system is in the "S4 or the "S5" state. Then, in step 530, when the main system is in the working state, the basic input/output system is used to poll the synthetic aperture radar; next, in step 531, the basic input/output system examines the logic level of the general purpose input/output port through the Windows management instrumentation. When the synthetic aperture radar send to a south bridge circuit an event indicating that it is sensed that a charged body is positioned near the second input device, in step 532, the basic input/output system is used to detect that general purpose input/output port of the south bridge circuit has a logic level of 1; and in step 522, a control command is sent to the first input device based on the detection result; then, in step 523, the first input device is disabled.

On the contrary, when the synthetic aperture radar does not sent to the south bridge circuit an event indicating that the charged body is positioned near to the second input device, then in step 533, the basic input/output system is used to detect that the general purpose input/output port of the south bridge circuit has a logic level of "0," and the operation is terminated.

Still alternatively, first, in step 513, the main system is in the idle state; then, in step 514, the main system is return from the idle state. In step 515, the main system is woken from the idle state by the input from the first input device; next, in step 516, the embedded controller is used to update the logic state; for example, the logic state is recorded as "1" and in step 530, when the main system is in the working state, the basic input/output system is used to poll the synthetic aperture radar; next, in step 531, the basic input/output system examines the logic level of the general purpose input/output port through the Windows management instrumentation. When the synthetic aperture radar send to a south bridge circuit an event indicating that it is sensed that a charged body is positioned near the second input device, in step 532, the basic input/output system is used to detect that general purpose input/output port of the south bridge circuit has a logic level of 1; and in step 522, a control command is sent to the first input device based on the detection result; then, in step 523, the first input device is disabled.

In view of the foregoing, the present invention is capable of dynamically determining that whether the user intends to use the first input device or the second input device, so that user may use the electronic device more smoothly. Also, the invention may improve the working efficiency of the user by preventing accidental touch, and thereby reduce the time cost incurred owing to the accidental touch.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. An electronic device for preventing an accidental touch, the electronic device comprising:
    a first input device;
    a second input device;
    a synthetic aperture radar, configured to sense whether a charged body is positioned near the second input device, such that when the charged body is positioned near the second input device, the voltage state of the synthetic aperture radar is pulled to a first logic level; and
    a main system, configured to disable the first input device when the voltage state of the synthetic aperture radar is the first logic level.

2. The electronic device according to claim 1, wherein when the charged body is not positioned near the second input device, the voltage state of the synthetic aperture radar is pulled to a second logic level; and the main system enables the first input device.

3. The electronic device according to claim 1, wherein the main system comprises:
    an embedded controller, electrically connecting the first and the second input devices with the synthetic aperture radar, such that when the main system is in a working state, the embedded controller is configured to poll the synthetic aperture radar, and when the voltage state of the synthetic aperture radar is the first logic level, sends a control command to the first input device so that the first input device is disabled.

4. The electronic device according to claim 1, wherein the main system comprises:
    an embedded controller, electrically connecting the first and the second input devices with the synthetic aperture radar, such that after the main system is woken from an idle state by the input from the first input device, the embedded controller polls the synthetic aperture radar, and when the voltage state of the synthetic aperture radar is the first logic level, sends a control command to the first input device so that the first input device is disabled.

5. The electronic device according to claim 4, wherein when the main system is woken from the idle state by the input from the second input device, the embedded controller does not poll the synthetic aperture radar.

6. The electronic device according to claim 1, wherein the main system comprises:
    an embedded controller, electrically connected to the first and the second input devices;
    a south bridge circuit, electrically connected to the synthetic aperture radar; and
    a basic input/output system, electrically connected to the south bridge circuit, such that when the main system is in a working state, the basic input/output system is configured to poll the synthetic aperture radar, when the synthetic aperture radar sends to the south bridge circuit a signal indicating that the synthetic aperture radar senses that the charged body is positioned near the second input device, the basic input/output system detects that the general purpose input/output port of the south bridge circuit has an logic level of 1 and sends a control command to the first input device so that the first input device is disabled.

7. The electronic device according to claim 1, wherein the main system comprises:
    an embedded controller, electrically connected to the first and the second input devices;
    a south bridge circuit, electrically connected to the synthetic aperture radar; and
    a basic input/output system, electrically connected to the south bridge circuit, such that when the main system is woken from an idle state by the input from the first input device, the basic input/output system is configured to poll the synthetic aperture radar, when the synthetic aperture radar sends to the south bridge circuit a signal indicating that the synthetic aperture radar senses that the charged body is positioned near the second input device, the basic input/output system detects that the general purpose input/output port of the south bridge circuit has a logic level of 1 and sends a control command to the first input device so that the first input device is disabled.

8. The electronic device according to claim 7, wherein when the main system is woken from the idle state by the input from the second input device, the basic input/output system does not poll the synthetic aperture radar.

9. An operating method of an electronic device for preventing the accidental touch, the electronic device comprising a first input device and a second input device, and the operating method comprising the steps of:
    using a synthetic aperture radar to sense whether a charged body is positioned near the second input device, such that when the charged body is positioned near the second input device, the voltage state of the synthetic aperture radar is pulled to a first logic level; and
    disabling the first input device, when the voltage state of the synthetic aperture radar is the first logic level.

10. The operating method according to claim 9, wherein when the charged body is not positioned near the second input device, the voltage state of the synthetic aperture radar is pulled to a second logic level, the operating method further comprises:
  enabling the first input device, when the voltage state of the synthetic aperture radar is the second logic level.

11. The operating method according to claim 9, wherein the step of disabling the first input device comprises:
  using an embedded controller to poll the synthetic aperture radar, when the main system of the electronic device is in a working state; and sending a control command to the first input device thereby disabling the first input device, when the voltage state of the synthetic aperture radar is the first logic level.

12. The operating method according to claim 9, wherein the step of disabling the first input device comprises:
  using an embedded controller to poll the synthetic aperture radar, when the main system of the electronic device is woken from an idle state by the input from the first input device; and sending a control command to the first input device thereby disabling the first input device, when the voltage state of the synthetic aperture radar is the first logic level.

13. The operating method according to claim 12, further comprising:
  using the embedded controller to terminate operation, when the main system of the electronic device is woken from an idle state by the input from the second input device.

14. The operating method according to claim 9, wherein the step of disabling the first input device comprises:
  using a basic input/output system to poll the synthetic aperture radar, when the main system of the electronic device is in a working state; and when the synthetic aperture radar sends to a south bridge circuit a signal indicating that the synthetic aperture radar senses that the charged body is positioned near the second input device, using the basic input/output system to detect that the general purpose input/output port of the south bridge circuit has a logic level of 1 and send a control command to the first input device thereby disabling the first input device.

15. The operating method according to claim 9, wherein the step of disabling the first input device comprises:
  when the main system of the electronic device is woken from an idle state by the input from the first input device, using an embedded controller to poll the synthetic aperture radar, and using a basic input/output system to poll the synthetic aperture radar; and when the synthetic aperture radar sends to a south bridge circuit a signal indicating that the synthetic aperture radar senses that the charged body is positioned near the second input device, using the basic input/output system to detect that the general purpose input/output port of the south bridge circuit has a logic level of 1 and consequently send a control command to the first input device thereby disabling the first input device.

16. The operating method according to claim 15, further comprising:
  using the embedded controller to terminate the operation, when the main system of the electronic device is woken from an idle state by the input from the second input device.

* * * * *